(12) United States Patent
Iwamoto et al.

(10) Patent No.: US 11,243,598 B2
(45) Date of Patent: Feb. 8, 2022

(54) PROACTIVE POWER MANAGEMENT OF A GRAPHICS PROCESSOR

(71) Applicant: Apple Inc., Cupertino, CA (US)

(72) Inventors: Tatsuya Iwamoto, Foster City, CA (US); Jason P. Jane, San Jose, CA (US); Rohan Sanjeev Patil, San Francisco, CA (US); Kutty Banerjee, San Jose, CA (US); Subodh Asthana, Sunnyvale, CA (US); Kyle J. Haughey, San Jose, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 16/426,633

(22) Filed: May 30, 2019

(65) Prior Publication Data

US 2019/0369707 A1 Dec. 5, 2019

Related U.S. Application Data

(60) Provisional application No. 62/679,667, filed on Jun. 1, 2018.

(51) Int. Cl.
| | | |
|---|---|---|
| *G06F 1/32* | (2019.01) | |
| *G06F 1/3234* | (2019.01) | |
| *G06F 1/3287* | (2019.01) | |
| *G06T 1/20* | (2006.01) | |
| *G06F 17/18* | (2006.01) | |
| *G06F 1/3228* | (2019.01) | |

(52) U.S. Cl.
CPC .......... *G06F 1/3243* (2013.01); *G06F 1/3228* (2013.01); *G06F 1/3287* (2013.01); *G06F 17/18* (2013.01); *G06T 1/20* (2013.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 9,261,939 B2 | 2/2016 | Biswas | |
| 9,405,345 B2 * | 8/2016 | Ananthakrishnan | .... G06F 1/206 |
| 2003/0061383 A1 * | 3/2003 | Zilka | ...... G06F 1/3243 |
| | | | 709/245 |
| 2003/0105983 A1 * | 6/2003 | Brakmo | ................ G06F 1/3203 |
| | | | 713/320 |
| 2004/0139356 A1 * | 7/2004 | Ma | ........................ G06F 1/3253 |
| | | | 713/300 |

(Continued)

*Primary Examiner* — Phil K Nguyen
(74) *Attorney, Agent, or Firm* — Blank Rome LLP

(57) ABSTRACT

Systems, methods, and computer readable media to manage power for a graphics processor are described. When the power management component determines the graphics processor is idle when processing a current frame by the graphics processor, the power management component predicts an idle period for the graphics processor based on the work history. The power management component obtains a first latency value indicative of a power on time period and a second latency value indicative of a power off time period for a graphics processor component, such as graphics processor hardware. The power management component provides power instructions to transition the graphics processor component to the power off state based on a determination that a combined latency value of the first latency value and the second latency value is less than the idle period.

21 Claims, 7 Drawing Sheets

(56) References Cited

U.S. PATENT DOCUMENTS

| | | | | |
|---|---|---|---|---|
| 2008/0028240 A1* | 1/2008 | Arai | ................ | G06F 1/3203 |
| | | | | 713/300 |
| 2009/0150695 A1* | 6/2009 | Song | ................ | G06F 1/28 |
| | | | | 713/323 |
| 2010/0123727 A1 | 5/2010 | Kwa | | |
| 2010/0287396 A1* | 11/2010 | Barth | ................ | G06F 11/3423 |
| | | | | 713/323 |
| 2011/0066868 A1* | 3/2011 | Atkinson | ................ | G06F 1/26 |
| | | | | 713/323 |
| 2011/0173474 A1* | 7/2011 | Salsbery | ................ | G06F 1/206 |
| | | | | 713/323 |
| 2012/0188262 A1 | 7/2012 | Rabii | | |
| 2013/0027413 A1* | 1/2013 | Jayavant | ................ | G06F 1/3278 |
| | | | | 345/520 |
| 2013/0097415 A1 | 4/2013 | Li | | |
| 2013/0111092 A1* | 5/2013 | Heller | ................ | G06F 13/24 |
| | | | | 710/267 |
| 2014/0149772 A1* | 5/2014 | Arora | ................ | G06F 1/3234 |
| | | | | 713/323 |
| 2015/0198991 A1* | 7/2015 | Bircher | ................ | G06F 1/3287 |
| | | | | 713/323 |

* cited by examiner

| APPLICATION A 870 | PHOTOS 871 | QUICKEN 872 | IMOVIE 873 | APPLICATION B 874 | } 875 |
|---|---|---|---|---|---|
| OTHER APPLICATION SERVICES 860 | SPRITE KIT 861 | SCENE KIT 862 | CORE ANIMATION 863 | CORE GRAPHICS 864 | } 880 |
| O/S SERVICES 850 | OPENGL OR OPENCL 851 | METAL 852 | USER SPACE DRIVERS 853 | SOFTWARE RASTERIZER 854 | } 885 |
| O/S KERNEL 845 | | | | | } 890 |
| HARDWARE 840 | | | | | } 895 |

*FIG. 8*

PROACTIVE POWER MANAGEMENT OF A GRAPHICS PROCESSOR

BACKGROUND

This disclosure relates generally to the field of graphics processing. More particularly, but not by way of limitation, this disclosure relates to proactively managing power for a graphics processor, such as a graphics processing unit (GPU).

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include, but are not limited to, a GPU, a digital signal processor (DSP), a field programmable gate array (FPGA), and/or a CPU emulating a GPU. GPUs, in particular, comprise multiple execution cores (also referred to as shader cores) designed to execute commands on parallel data streams, making them more effective than general-purpose processors for operations that process large blocks of data in parallel. For instance, a CPU functions as a host and hands-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

One goal for managing hardware resources, such as a GPU, is being able to balance performance and power consumption. For instance, to enhance performance within a computing system, a GPU can continuously be powered to promptly process work received from the CPU. Moreover, some computing system can be setup to increase the voltage and/or frequency that drives the GPU in order to increase GPU throughput. Unfortunately, increasing the GPU's performance and/or continuously having the GPU in a power on state typically increases power consumption. In certain situations, increasing power consumption may not be a feasible option. For example, increasing power consumption may not be practical for power saving mode operations (e.g., powered by a battery) and/or low power consumption operations (e.g., mobile electronic devices). The drawback with power reduction operations is that often times reducing power consumption diminishes performance. As an example, powering down a GPU every time the GPU becomes idle could cause delays as the GPU powers back on to process received work. As a result, each of these performance and power consumption conditions can cause sub-optimal utilization of hardware resources.

SUMMARY

In one implementation, a method to manage power for one or more graphics processor components. The example method receives work history for a plurality of previously processed frames by a graphics processor and create a probability distribution function for a current frame. The probability distribution function is indicative of a prediction of when the graphics processor will receive work for processing the current frame. The example method also obtains a latency value indicative of a time period to transition a component of the graphics processor from a first power state to a second power state. Afterwards, the example method instructs, when processing the current frame, the component of the graphics processor to transition to the second power state based on the probability distribution function and the latency value.

In another implementation, a system that comprises a graphics microcontroller operable to interact with the memory and configured to: receive work history for a plurality of previously processed frames by a graphics processor and monitor a current work cycle for a current frame being processed by the graphics processor. The graphics microcontroller is further configured to determine the graphics processor is idle for the current work cycle and predict an idle period for the graphics processor based on the work history. The graphics microcontroller is able to obtain a latency value indicative of a power on time period to transition a graphics processor hardware from a power off state to a power on state and subsequently instruct, when processing the current frame, the graphics processor hardware to transition to the power off state based on a determination that the latency value is less than the idle period.

In yet another implementation, a method comprising: receiving work history for a plurality of previously processed frames by a GPU and determining the GPU is idle for a current work cycle for a current frame being processed by the GPU. The example method is able to perform a heuristics operation to predict an idle period for the GPU based on the work history. The example method is also able to obtain a first latency value indicative of a power on time period to transition a GPU component from a power off state to a power on state and a second latency value indicative of a power off time period to transition the GPU component from the power on state to the power off state. The example method is able to provide power instructions to transition the GPU component to the power off state based on a determination that a combined latency value of the first latency value and the second latency value is less than the idle period.

In one embodiment, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain embodiments will be described in connection with the illustrative embodiments shown herein, this disclosure is not limited to those embodiments. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 8 is a block diagram of an implementation of a software layer and architecture where embodiments of the present disclosure may operate.

DETAILED DESCRIPTION

Figure 1:
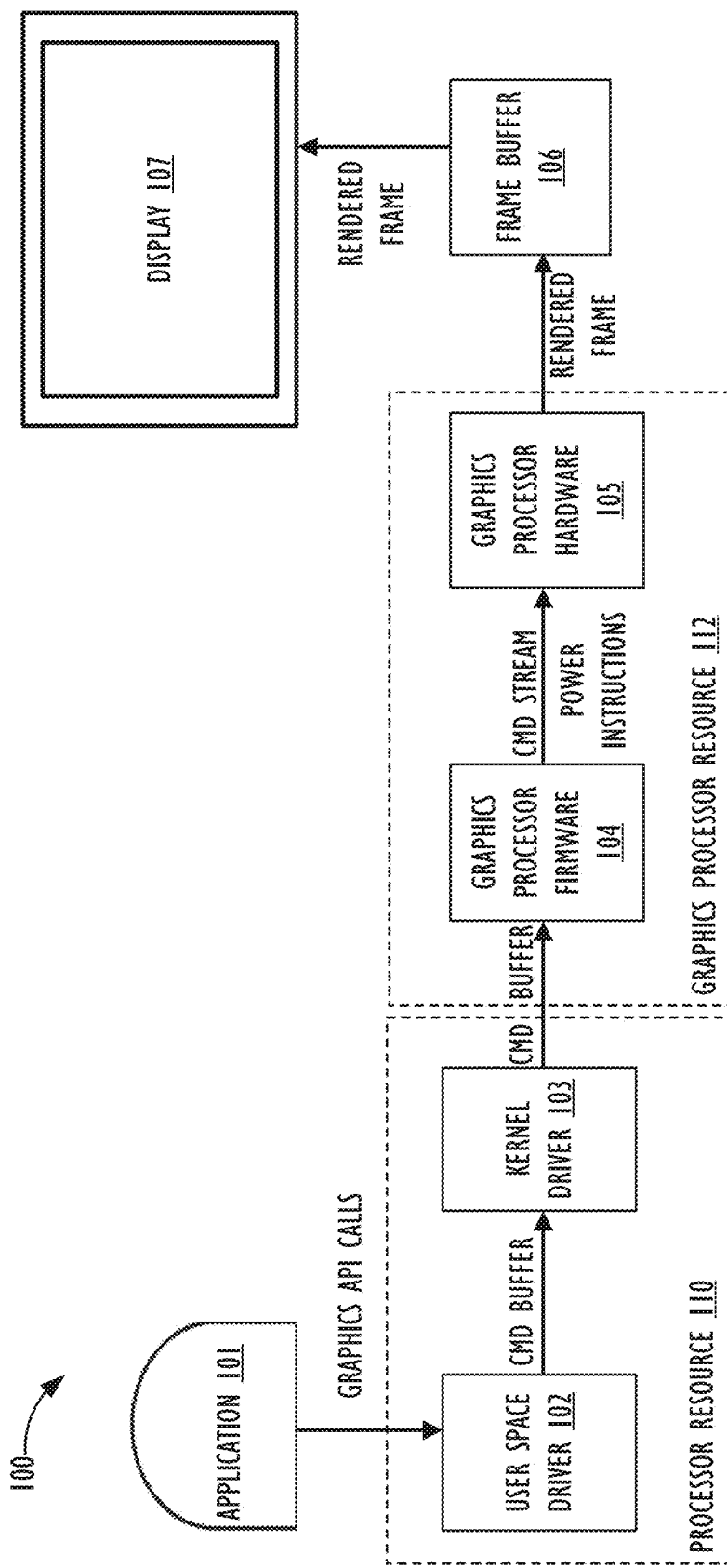
FIG. 1 is a diagram of a graphics processing path where embodiments of the present disclosure may operate.

This disclosure includes various implementations that proactively manages power for a graphics processor. In one or more implementations, the graphics processor includes a graphics microcontroller that regulates the power states for a graphics processor. To determine when to power on and off the graphics processor, the graphics microcontroller predicts when the graphics processor will receive work when processing a graphics frame. In particular, the graphics microcontroller is able to perform heuristic operations to anticipate when the graphics processor can power down after becoming idle or power up after being turned off. For example, the graphics microcontroller creates a frame structure histogram that includes a probability distribution function curve. The graphics microcontroller generates the probability distribution function curve based on available work histories for a number of pervious frames. The graphics microcontroller can then utilize the frame structure histogram and/or other factors, such as power and performance settings and/or confidence levels, to predict when to power on and off the graphics processor.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "application program interface (API) call" in this disclosure refers to an operation an application is able to employ using a graphics application program interface (API). Examples of API calls include draw calls for graphics operations and dispatch calls for computing operations. Examples of graphics API include OpenGL®, Direct3D®, or Metal® (OPENGL is a registered trademark of Silicon Graphics, Inc.; DIRECT3D is a registered trademark of Microsoft Corporation; and METAL is a registered trademark of Apple Inc.). Generally, a graphics driver translates API calls into commands a graphics processor is able to execute. The term "command" in this disclosure refers to a command encoded within a data structure, such as command buffer or command list. The term "command" can refer to a "render command" (e.g., for draw calls) and/or a "compute command" (e.g., for dispatch calls) that a graphics processor is able to execute.

For the purposes of this disclosure, the term "processor" refers to a programmable hardware device that is able to process data from one or more data sources, such as memory. One type of "processor" is a general-purpose processor (e.g., a CPU or microcontroller) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. As previously presented, examples of these general compute operations are compute commands associated with compute kernels.

FIG. 1 is a diagram of a graphics processing path 100 where implementations of the present disclosure may operate. FIG. 1 illustrates an example in which the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory, other microcontrollers, and/or any other hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., memory cache), and/or other hardware resources to execute programs, such as shaders or compute kernels. Graphics processor resource 112 is able to process shaders with a rendering pipeline and compute kernels with a compute pipeline.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application that invokes the graphics API to convey a description of a graphics scene. Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the command buffers for execution on the graphics processor resource 112. As an example, the kernel driver 103 may perform memory allocation and scheduling of the command buffers to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains command buffers that processor resource 110 commits for execution. The graphics processor firmware 104 can perform a variety of operations to manage the graphics processor hardware 105 that includes powering on and off the graphics processor hardware 105 and/or scheduling the order of commands that the graphics processor hardware 105 receives for execution. With reference to FIG. 1 as an example, the graphics processor firmware 104 can be implemented by a graphics microcontroller that boots up firmware. Specifically, the graphics microcontroller could be embedded in the same package as a graphics processor within the graphic processor resource 112 and setup to pre-process commands for the graphics processor. In other implementations, the graphics microcontroller is physically separated from the graphics processor. The graphics microcontroller that runs graphics processor firmware 104 may be located on a different power domain than the graphics processor hardware 105 enabling the graphics microcontroller to be powered on and off independently from powering graphics processor hardware 105.

After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. The graphics processor hardware 105 includes multiple (e.g., numerous) execution cores, and thus, can execute a number of received commands in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

In a power management context, the graphics processor firmware 104 can be configured to manage the power states for graphics processor hardware 105. When graphics processor firmware 104 provides power instructions to power on or off, the graphics processor hardware 105 may experience a delay before reaching the designated power state. Stated another way, the graphics processor hardware 105 may be unable to power on and off instantaneously, and instead requires a certain latency to reach a designated power state. For example, the graphics processor hardware 105 is able to power on and start processing command streams about 300 microseconds (µs) after the graphics processor firmware 104 sends a power on instruction for the graphics processor hardware 105. Additionally, the graphics processor hardware 105 is able to power down (e.g., de-clock hardware components and ramp power down) about 100 µs after the graphics processor firmware 104 sends a power off instruction for the graphics processor hardware 105. Persons of ordinary skill in the art are aware that the actual latency to power on and off the graphics processor hardware 105 may vary depending on the underlying technology for graphics processor hardware 105.

Because the graphics processor hardware 105 is unable to power on and off instantaneously, to reduce power consumption while maintaining performance, the graphics processor firmware 104 may analyze available work histories to predict instances to power on and off the graphics processor hardware 105. In one or more implementations, the graphics processor firmware 104 employs heuristic operations to predict idle and work periods for graphics processor hardware 105. As an example, the graphics processor firmware 104 is able to compute a probability distribution function from available work histories to generate a frame structure histogram. The available work histories provides information on when the graphics processor hardware 105 had available work to process for a number of previously rendered graphics frames. The probability distribution function indicates the relatively likelihood that the graphics processor hardware 105 is going to be idle or will have work to process for a period of time and/or for a specific graphics processing activities (e.g., separation between vertex, pixel, and compute work). The graphics processor firmware 104 generates the frame structure histogram by overlaying or mapping the probability distribution function to a modeled frame structure to predict idle and work periods for graphics processor hardware 105. An example of a frame structure histogram is shown and discussed in more detail in FIGS. 3A and 3B.

The graphics microcontroller that runs graphics processor firmware 104 may be located on a different power domain than the graphics processor hardware 105. By being on separate power domains, the graphics processor firmware 104 is able to regulate when the graphics processor hardware 105 powers on or off. To determine whether to power on and off graphics processor hardware 105, the graphics processor firmware 104 may consider the frame structure histogram and/or other relevant factors. For example, the graphics processor firmware 104 may provide power instructions for the graphics processor hardware 105 based only on the frame structure histogram. In another example, the graphics processor firmware 104 may utilize the frame structure histogram in conjunction with power and performance settings and/or a confidence level associated with the frame structure histogram. In one or more implementations, the graphics processor firmware 104 accounts for multiple factors by implementing a weighted combination operation (e.g., weighted sum or weighted average operation) and compares the results of the weighted combination operation to one or more threshold values. Details regarding how the graphics processor firmware 104 determines whether to power on and power off graphics processor hardware 105 are discussed in more detail in FIGS. 3B and 4.

In implementations where the graphics processor firmware 104 regulates the power states for graphics processor hardware 105, the graphics microcontroller that runs graphics processor firmware 104 is generally powered on for longer periods of time. One reason for this is that the graphics microcontroller may need to provide power off instructions for the graphics processor hardware 105 before powering down itself. Additionally, the graphics microcontroller may power on first and subsequently provide power on instructions for the graphics processor hardware 105. The graphics microcontroller may also utilize a longer period of time to boot up and be ready to operate after powering on. For example, a graphics microcontroller may use about 1.3 milliseconds (ms) to power on and complete boot up operations relating to the graphics processor firmware 104. In this example, the power on time of about 1.3 ms is about four times as long as when the graphics processor hardware's 105 power on time is about 300 μs.

The graphics processor firmware 104 and/or another power management component (not shown in FIG. 1) manages the power states for the graphics microcontroller. In one or more implementations, the graphics processor firmware 104 and/or another power management component can utilize the same probability distribution function to manage both the power states of the graphics processor hardware 105 and graphics microcontroller. When utilizing the same probability distribution function, the graphics processor firmware 104 and/or another power management component may utilize separate threshold values for managing power states for graphics microcontroller when compared to the graphics processor hardware 105. The graphics processor firmware 104 and/or another power management component may also use different time periods and/or activities when managing the power states for the graphics microcontroller.

In another implementation, the graphics processor firmware 104 and/or another power management component may utilize a separate probability distribution function for determining whether to power on and power off the graphics microcontroller. In this instance, the probability distribution function associated with the graphics microcontroller could have a coarser sampling time interval than the probability distribution function associated with the graphics processor hardware 105. Probability distribution functions and the frame structure histogram are discussed in more detail with reference to FIGS. 3A and 3B.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to a User Interface Renderer (one example of a User Interface Renderer is referred to herein as Core Animation) to animate views and/or user interfaces for application 101. FIG. 1 also does not illustrate all of the hardware resources and/or components that graphics processing path 100 may utilize (e.g., power management components or memory resources, such as system memory). Additionally or alternatively, even though FIG. 1 illustrates that processor resource 110 and graphics processor resource 112 are separate devices, other implementations could have the processor resource 110 and graphics processor resource 112 integrated on a single device (e.g., a system-on-chip). The use and discussion of FIG. 1 is only an example to facilitate ease of description and explanation.

Figure 2:
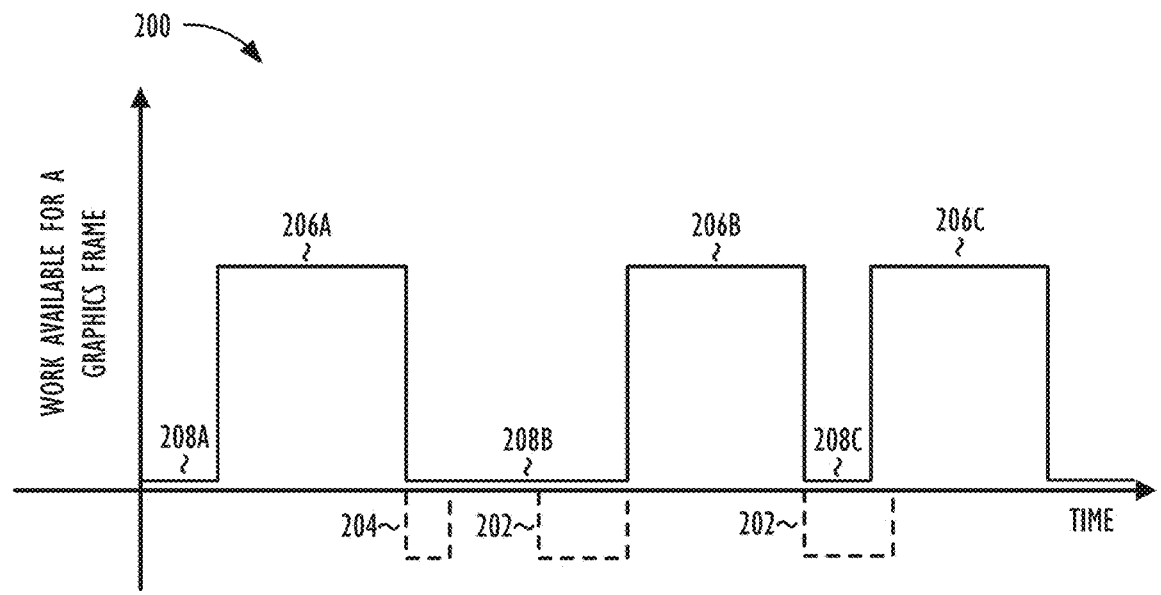
FIG. 2 depicts a graph illustrative of an example of a graphics processor's work cycle for a given graphics frame.

FIG. 2 depicts a graph 200 illustrative of an example of a graphics processor's work cycle for a given graphics frame. In particular, graph 200 includes work periods 206A, 206B, and 206C, where each work period 206 represents a time period where the graphics processor has available work to process for the given graphics frame. As used herein, the term "work" in this disclosure refers to a discrete unit of instructions that are submitted to a graphics processor. In one or more implementations, commands committed for a graphics processor to execute are subdivided into a finer granularity of instructions for the graphics processor to process, where the finer granularity of instructions represent work for the graphics processor. The term "work" can also be referenced throughout this disclosure as a "kick." During work periods 206A, 206B, and 206C, the graphics processor remains in a power on state to process the available work. Idle periods 208A, 208B, and 208C, each represent a time period where the graphics processor is idle and has no work to process for the given graphics frame. During idle periods 208A, 208B, and 208C, the graphics processor can power down to conserve power.

Graph 200 also includes a power off latency 204 and a power on latency 202 that for one or more components in a graphics processor. Recall that a graphics processor could include a graphics microcontroller and graphics processor hardware with numerous execution cores. In one example, the power off latency 204 represents the time delay to power off either the graphics processor hardware or the graphics microcontroller, and the power on latency 202 represents the latency to power on either the graphics processor hardware or the graphics microcontroller. In another example, the power off latency 204 and power on latency 202 represents the total delay time to power off and on both the graphics microcontroller and graphics processor hardware, which may be relevant for implementations where the graphics microcontroller is powered on before powering on the graphics processor hardware and powered off after powering off the graphics processor hardware.

FIG. 2 illustrates that the time period for idle period 208B is longer than the combined latency of the power off latency 204 and the power on latency 202. Since the combined latency of the power off latency 204 and the power on latency 202 is less than the idle period 208B, a graphics processor may be able to reduce power consumption without sacrificing performance by powering off one or more components of a graphics processor (e.g., graphics processor hardware and/or the graphics microcontroller). As shown in FIG. 2, one or more components of the graphics processor can power off after processing the last available work associated with work period 206A and power on right before receiving first available work associated with work period 206B. To be able to capitalize on the power savings, a power management component (e.g., graphics microcontroller) would need to recognize or predict that there is a relatively high likelihood that the idle period 208B will probably exceed both the power off latency 204 and the power on latency 202.

FIG. 2 also depicts that the time period for idle period 208C is less than the power on latency 202. In this instance, a graphics processor may not benefit from powering off and on the graphics processor hardware and/or the graphics microcontroller at idle period 208C. For idle period 208C, the graphics processor may experience a delay in processing work received at work period 206C if the graphics microcontroller and/or graphics processor hardware powers off after completing work for work period 206B. By way of example, assuming that the power on latency 202 refers to powering on graphics processor hardware and is about 300 µs long and the power off latency 204 refers to powering off graphics processor hardware and is about 100 µs, the power off and on time for the graphics processor hardware is a minimum of 400 µs. If the time period for idle period 208C is, for example, about 100 µs, then powering off and on the graphics processor after work period 206B creates a 300 µs delay that potentially reduces the graphics processor's performance.

Figure 3A:
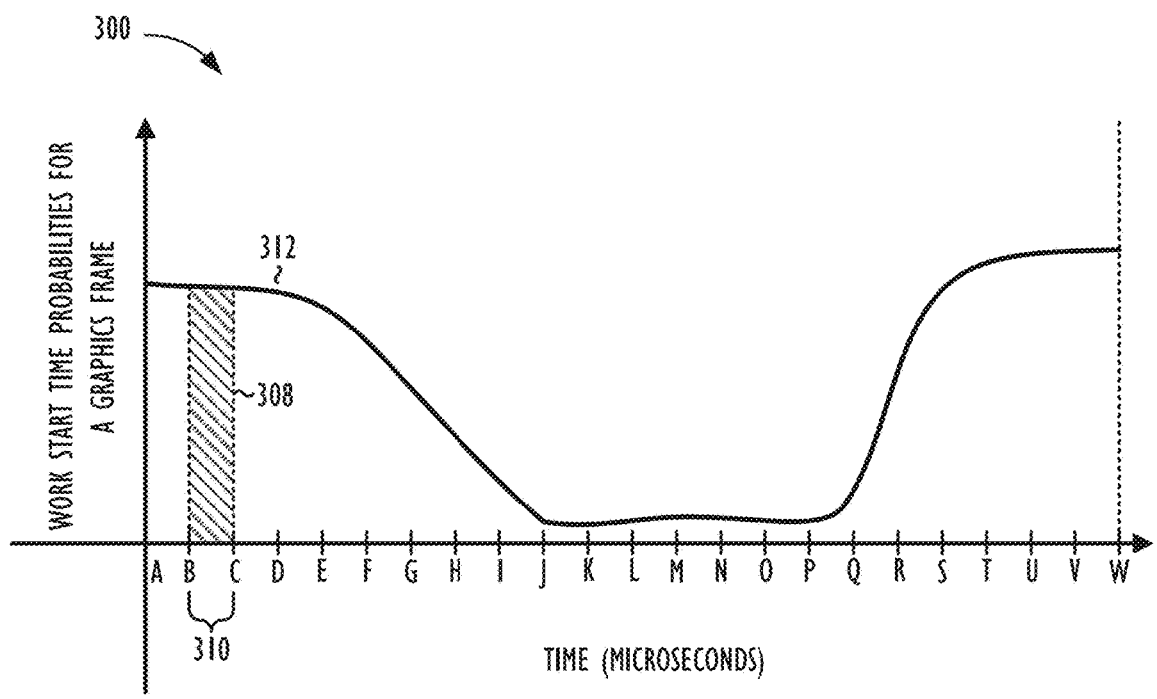
FIG. 3A illustrates an example of a frame structure histogram that maps a probability distribution function curve to a modeled graphics frame structure.

FIG. 3A illustrates an example of a frame structure histogram 300 that maps a probability distribution function curve 312 to a modeled graphics frame structure. As shown in FIG. 3A, the x-axis within the frame structure histogram 300 represents a period of time, from time point A to time point W, for rendering a modeled graphics frame. In FIG. 3A, the x-axis is subdivided into sampling time intervals 310, where each sampling time interval 310 (e.g., from time point A to time point B on x-axis) represents the window of time that a power management component (e.g., a graphics microcontroller) uses to sample data and update the probability distribution function curve 312. At each sampling time interval 310, the power management component may filter out data from older rendered frames as a graphics processor continuously renders new graphics. For example, if the sampling time interval 310 represents 200 µs, once every 200 µs, the graphics microcontroller collects available work histories for a filtered set of previously rendered frames. Afterwards, the power management component updates the probability distribution function curve 312 based on the collected available work histories. As a result, the probability distribution function curve 312 changes over time at the different time points (e.g., time point A).

The area under the probability distribution function curve 312 represents the work start time probability for a graphics processor. Using FIG. 3A as an example, area 308 represents the probability that work for graphics processor will start between time point B and time point C. Based on the probability distribution function curve 312, FIG. 3A illustrates that the graphics processor initially has a relatively higher probability of work starting from time point A to time point I. From time point I to time point Q, the probability distribution function curve 312 drops off to indicate that there is a relatively lower probability that the graphics processor will have work starting. After time point Q, the probability distribution function curve 312 increases again to depict that after point Q, the graphics processor has a relatively higher probability in having work starting. The graphics microcontroller may then use the probability distribution function curve's 312 prediction of whether the graphics processor anticipates any work starts to determine whether to power on or off one or more components of a graphics processor.

Figure 3B:
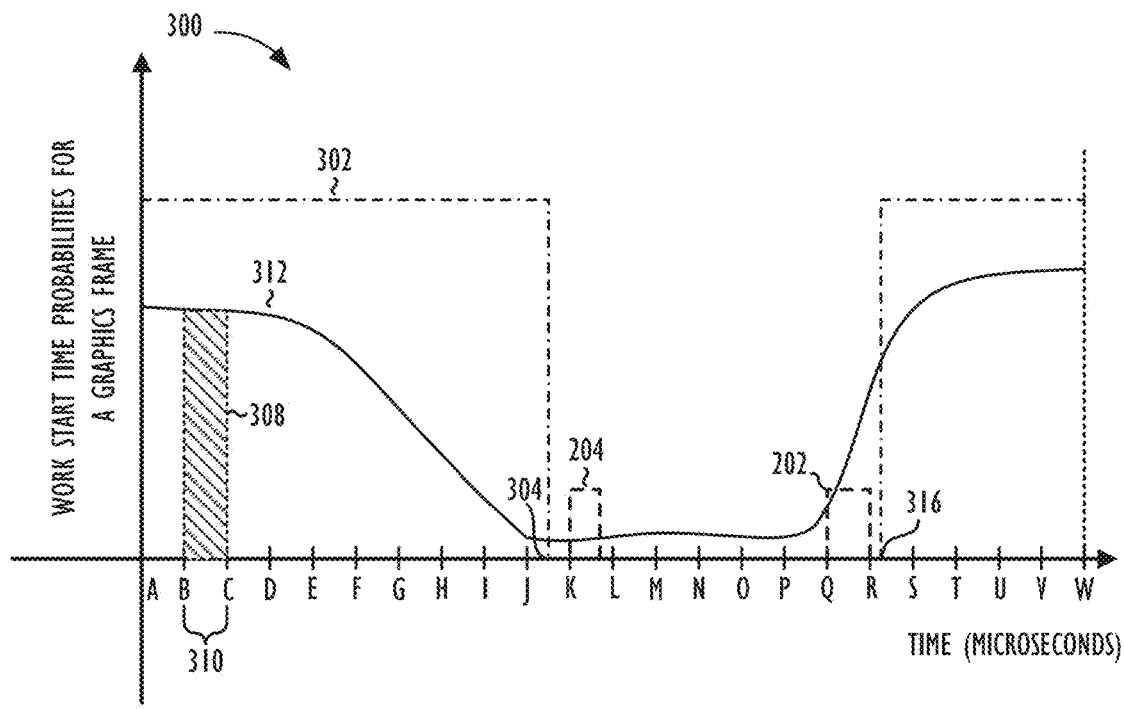
FIG. 3B illustrates overlaying a work cycle for a current frame to frame structure histogram.

For explanation purposes, FIG. 3B illustrates overlaying a work cycle 302 for a current frame to frame structure histogram 300. In particular, the work cycle 302 include two different work periods where the graphics processor has available work for a current frame. The first work period ends at point 304 when the power management component determines no other available work is scheduled to execute. The graphics processor remains idle and does not have any additional work to process until point 316. At point 316, the power management component detects the presence of available work according to work cycle 302.

In one or more implementations, a power management component (e.g., graphics microcontroller) may utilize the probability distribution function curve 312 to power on or off one or more components of a graphics processor. For instance, the probability distribution function curve 312 could be used for regulating power states for the graphics processor hardware. Alternatively, the probability distribution function curve 312 can be used for managing power states for a graphics microcontroller that runs the graphics processor firmware (e.g., graphics processor firmware 104 shown in FIG. 1). In certain implementations, the power management component may generate a probability distribution function curve 312 for each graphics processor component that can independently power on or off. By way of example, the graphics microcontroller could generate one probability distribution function curve 312 for the graphics microcontroller and a separate probability distribution function curve 312 for the graphics processor hardware.

Once the graphics processor no longer has any available work to process at point 304, the power management component uses the probability distribution function curve 312 to predict when the graphics processor is likely to receive and start processing work. Based on the probability distribution function curve 312, the power management component may determine that the probability of work starts from time point K to time point Q is relatively low. After time point Q, the power management component may then determine that the probability of starting to process work begins to increase at a relatively higher rate. Based on this analysis, the power management component may then determine the time difference between time point K and time point Q and compare the time difference with the power on and off times for one or more components of a graphics processor. If the time difference between time point K and time point Q is greater than the power on and off times, then the power management component may determine to power off one or more components of the graphics processor.

As an illustrative example, a power management component, such a graphics microcontroller, may utilize probability distribution function curve 312 to determine whether to power off the graphics processor hardware. The sampling time interval 310 shown in FIG. 3B could be set to about 300 µs, which represents the amount of time to power on the graphics processor hardware. The power off latency 204 is shown to be less than one of the sampling time intervals (e.g., 200 µs) and the power on latency 202 is shown to be equal to the sampling time interval. Since the power on and off time (e.g., 500 µs) for the graphics hardware is less than the time difference between time point K and time point Q (e.g., 1800 µs), the graphics microcontroller may determine to power off the graphics processor hardware. Based on the probability distribution function curve 312, once the graphics processor hardware powers off, the graphics processor is unlikely to start processing work for another 1500 us, which is more than enough time to power on the graphics processor hardware. FIG. 3B depicts that at time point K, the graphics processor hardware starts power off operations and completes before reaching time point L.

The graphics microcontroller may also utilize probability distribution function curve 312 to determine when to power back on components of a graphics processor hardware. Ideally, to conserve power, components of the graphics processor should reach the power on state right before receiving available work. If components of the graphics processor reach a power on state before receiving available work, then the graphics processor consumes power while remaining idle. Conversely, if components of the graphics processor reach a power on state after receiving available work, then graphics processor suffers from latency originating from power on operations.

Continuing with the previous example, after the graphics processor hardware reaches a power off state, the graphics microcontroller attempts to predict when the graphics processor is likely to receive and start work processing. In FIG. 3B, the power management component may determine that after time point Q, the probability of receiving work starts to increase at a relatively higher rate. Based on the increase in the probability distribution function curve 312, the graphics microcontroller may determine to start power on operations at time point Q. FIG. 3B illustrates that the graphics processor hardware reaches the power on state at time point R. Afterwards, when graphics processor receives work at point 316, then graphics processor hardware is able to process work without any time delay. If the work cycle 302 had indicated that the graphics processor receives work at time point Q rather than point 316, the power on latency 202 would cause a delay for processing the work.

Although FIGS. 3A and 3B illustrates a specific implementation of a frame structure histogram 300, the disclosure is not limited to the specific implementation illustrated in FIG. 1. For instance, rather than having the probability distribution function curve 312 represent the probability of work start times for a graphics processor, other implementations could have create a probability distribution function curve 312 that represents the probability of whether available work is present for a graphics processor. Alternatively, instead of the frame structure histogram 300 being a time-based histogram for modelling a graphics frame, other implementations could create an activity-based histogram for modelling the graphics frame. For example, rather than have each unit on the x-axis represent a sampling time interval, each unit could represent different graphics processing activity, such as vertex work, pixel work, and/or compute work. Other attributes could include, but are not limited to, duration of work, cycles, and/or client of the work. The use and discussion of FIGS. 3A and 3B are only an example to facilitate ease of description and explanation.

Figure 4:
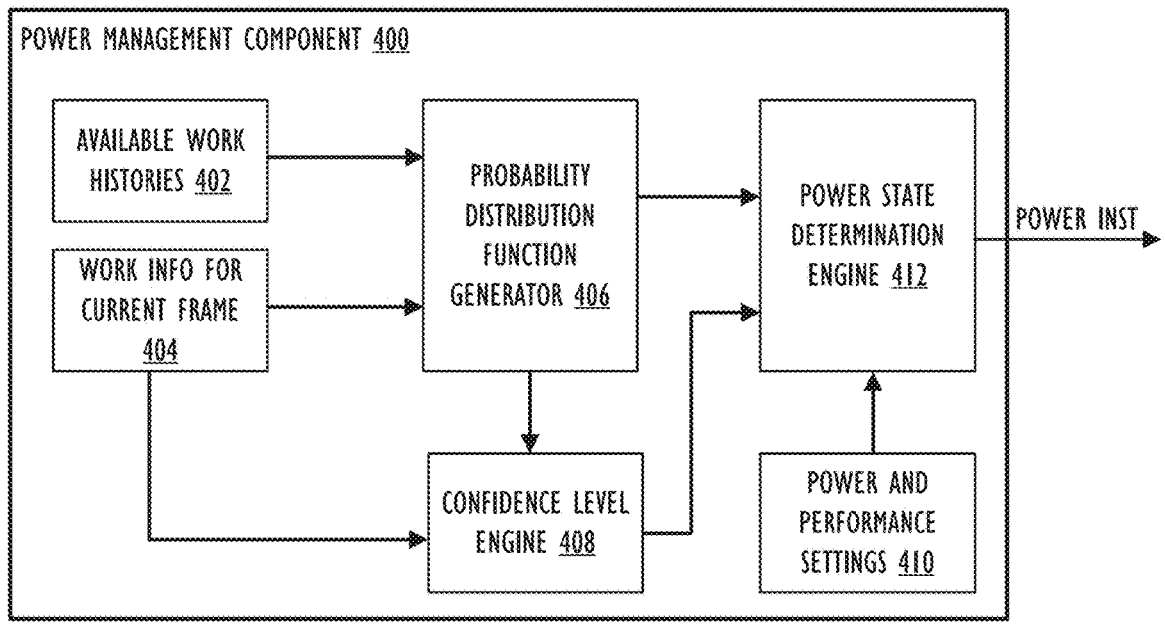
FIG. 4 is a block diagram of an implementation of a power management component.

FIG. 4 is a block diagram of an implementation of a power management component 400. The power management component 400 could be implemented as a graphics microcontroller, a component that is external to a graphics processor, or a combination thereof. As an example, the power management component 400 can be a graphics microcontroller that determines when to power on or off graphics processor hardware. In another example, the power management component 400 includes the graphics microcontroller and a power management unit external to a graphics processor to determine when to power on or off the graphics microcontroller. Referring back to FIG. 4, the power management component 400 can determine whether to power on or off components in a graphics processor based not only on a probability distribution function, but other factors, such as confidence level and power and performance settings.

The probability distribution function generator 406 generate a probability distribution function curve to create an activity-based frame structure histogram or a time-based frame structure histogram. To generate the probability distribution function curve, the probability distribution function generator 406 obtains available work histories 402 and work information for current frame 404. The available work histories 402 includes information about when work was present for processing and/or work start times for previously rendered frames. The work information for current frame 404 includes information on whether the graphics processor currently has work to process that the graphics processor. As previously discussed, for a time-based frame structure histogram, the probability distribution function generator 406 generates and/or updates the probability distribution function curve at a given sampling interval. Examples of probability distribution function curves that probability distribution function generator 406 could generate include a probability distribution function curve indicative of the probability that work is present for a graphics processor and a probability distribution function curve indicative of work start time probabilities.

In FIG. 4, the power management component 400 also includes a confidence level engine 408 to assess the confidence of the probability distribution function curve generated by probability distribution function generator 406. Generally, graphics frame being rendered for a graphics application do not drastically change from frame-to-frame. For example, a scene within a video or video game, can gradually change as a user continues to watch or interact with the media content. The video or video game may steadily pan to the left or right to progressively create different viewpoints of the scene. In these sets of frames, the confidence of the probability distribution function curve may be relatively high. However, when a video or video game completely changes to a different scene or the application generates a new user interface, the confidence of the probability distribution function curve may become relatively low. In these instances, a currently rendered frame would have relatively low commonality with previously rendered frame.

In one or more implementations, the confidence level engine 408 may generate a confidence level by comparing the probability distribution function curve and the work information for the current frame 404. As a graphics processor processes work for the current frame, the confidence level engine 408 compares how close the work information for the current frame 404 relates to the probability distribution function curve received from the probability distribution function generator 406 and subsequently generates a confidence factor. The confidence factor represents the power management component's 400 estimated certainty for the accuracy of the probability distribution function curve. As an example, if the work information for the current frame 404 closely matches the generated probability distribution function curve, the confidence level engine 408 generates a positive confidence factor (e.g., +0.9). Conversely, if the work information for the current frame 404 significantly differs from the generated probability distribution function curve, the confidence level engine 408 generates a negative factor (e.g., −0.9). In one or more implementations, the confidence level engine 408 may be relatively low that the power management component 400 clears the probability distribution function generated within probability distribution function generator 406 and restarts generating a new probability distribution function.

In one or more implementations, the power management component 400 also includes a power and performance settings 410 stored within memory. The power and performance settings 410 represents settings for the graphics processor and/or a computing system that includes the graphics processor set by a user and/or dynamically set by the computing system. For example, a user may manually initially set the power and performance settings 410 to a high relatively power consumption and performance. Afterwards, the computing system may automatically set the power and performance settings 410 to a low performance and power consumption setting when the graphics processor has been idle for a duration of time (e.g., about ten minutes) and the computing system switches to battery power.

As shown in FIG. 4, the power determination engine 412 shown in FIG. 4 obtains the probability distribution function curve information from the probability distribution function generator 406. When in a power on state, once the graphics processor no longer has any available work to process, the power determination engine 412 uses the probability distribution function curve 312 to predict when the graphics processor is likely to receive and start processing work again. In other words, the power determination engine 412 predicts an idle period and compares the idle period with the power on and off latency times for one or more components of a graphics processor. If the idle period is greater than the latency power on and off times, then the power determination engine 412 may determine that one or more components of a graphics processor could possibly transition to a power off state. The graphics microcontroller may also utilize probability distribution function curve 312 to determine to transition to a power on state for one or more components of a graphics processor.

The power determination engine 412 shown in FIG. 4 is also configured to consider one or more other factors to determine whether to power on or off one or more components of the graphics processor. Using FIG. 4 as an example, the power determination engine 412 receives the confidence factor and power and performance settings 410 when managing power for one or more components of the graphics processor. In one implementation, the power determination engine 412 may utilize the probability distribution curve information, the confidence factor, and the power and performance settings 410 to implement a weighted combination (e.g., weighted average) that generates a resulting value. The resulting value is compared to one or more thresholds to determine whether to power on or off one or more components of the graphics processor. For example, the resulting value may be compared to a threshold value corresponding to whether to power off one or more components of the graphics processor. Alternatively, the resulting value may be compared to a threshold value corresponding to whether to power on one or more components of the graphics processor. In another implementation, the power determination engine 412 may use the probability distribution curve information and the confidence factor within a weighted combination operation and use the power and performance settings 410 to generate different thresholds. By way of example, to power off one or more components of the graphics processor, the power determination engine 412 may use a relatively lower threshold value if the power and performance settings 410 are set for relatively lower power consumption. If the power and performance settings 410 is set for relatively high performance, the power determination engine 412 may use a relatively higher threshold value in determining whether to power off one or more components of the graphics processor.

Figure 5:
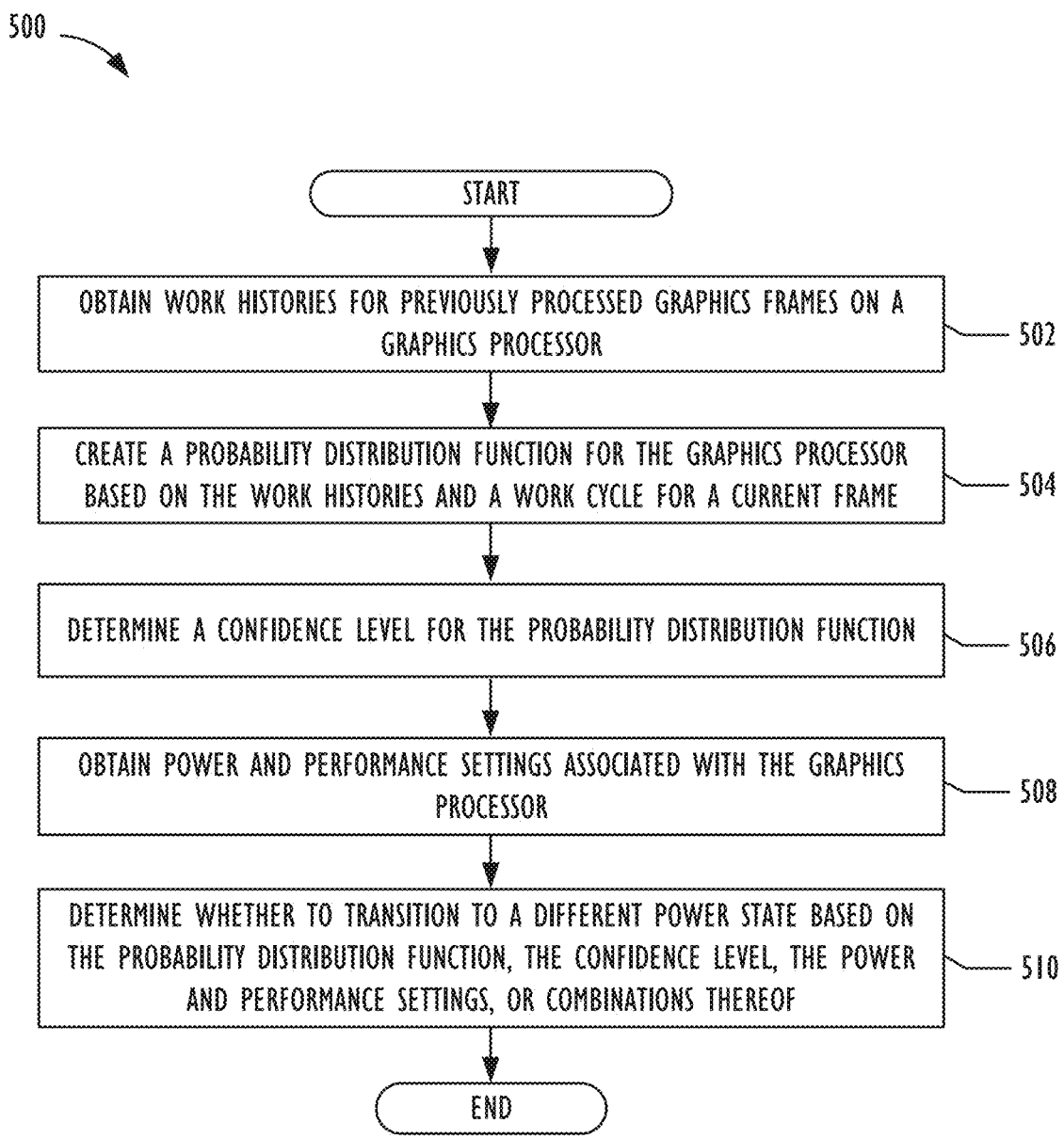
FIG. 5 depicts a flowchart illustrating a graphics processing operation that manages power for a graphics processor.

FIG. 5 depicts a flowchart illustrating a graphics processing operation 500 that manages power for a graphics processor. Operation 500 is able to predict idle periods and work periods for a graphics processor to determine when to transition to different power states for one or more components of a graphics processor. In one implementation, operation 500 may be implemented by a power management component 400 shown in FIG. 4 or using the graphics processor firmware 104 shown in FIG. 1. The use and discussion of FIG. 5 is only an example to facilitate explanation and is not intended to limit the disclosure to this specific example. For example, although FIG. 5 illustrates that the blocks within operation 500 are implemented in a sequential order, operation 500 is not limited to this sequential order. For instance, one or more of the blocks, such as blocks 504, 506, and/or 508, could be implemented in parallel. Additionally or alternatively, one or more blocks (e.g., block 508) may be optional such that operation 500 may not perform certain blocks each time operation 500 attempts to manage power for a graphics processor.

Operation 500 may start at block 502 and obtain work histories for previously processed graphics frames. The work histories includes information about when work was present for processing and/or work start times for previously rendered frames. Operation 500 may then move to block 504 and create a probability distribution function for a graphics processor based on a filtered set of work histories and a work cycle for a current frame. The work cycle for a current frame work information includes information on whether the graphics processor currently has work to process. At a specified time interval, operation 500 updates the probability distribution function curve 312 based on the filtered work histories and work cycle information for the current frame. As a result, the probability distribution function changes over time at different time points. Operation 500 may then move to block 506 determine a confidence level for the probability distribution function.

At block 506, operation 500 determines a confidence level for the probability distribution function. Operation 500 may generate a confidence level by comparing the probability distribution function curve and the work cycle for the current frame. As operation 500 processes work for the current frame, operation 500 compares how close the work information for the current frame 404 relates to the probability distribution function curve. Based on this comparison, operation 500 determine a confidence level. Operation 500 may then move to block 508 and obtain power and performance settings associated with the graphics processor. The power and performance settings are stored in memory for the graphics processor and/or a computing system that includes the graphics processor. Operation 500 may manually configure the power and performance settings and/or dynamically set by the computing system.

Operation 500 may then move to block 510 and determine whether transition to a different power state based on the probability distribution function, the confidence level, the power and performance settings, or combinations thereof. In one implementation, operation 500 obtains the probability distribution function and when in a power on state, predict when the graphics processor is likely to receive and start processing work again once the graphics processor enters an idle period. Operation 500 predicts the length of the idle period and compares the length of the idle period with the power on and off latency times for one or more components of a graphics processor. If the idle period is greater than the latency power on and off times, then the operation 500 determines that one or more components of a graphics processor transitions to a power off state. Operation 500 can also use the probability distribution function to determine to transition to a power on state for when in a power off state.

In one or more implementations, at block 508, operation 500 is able to consider one or more other factors to determine whether to power on or off one or more components of the graphics processor. For example, operation 500 utilizes the probability distribution curve, the confidence level, and the power and performance settings to implement a weighted combination (e.g., weighted average) that generates a resulting value. The resulting value is compared to one or more thresholds to determine whether to power on or off one or more components of the graphics processor. In another example, operation 500 may use the probability distribution curve and the confidence level within a weighted combination operation. The result of the weighted combination operation is compared to thresholds values, which depend on the power and performance settings.

Figure 6:
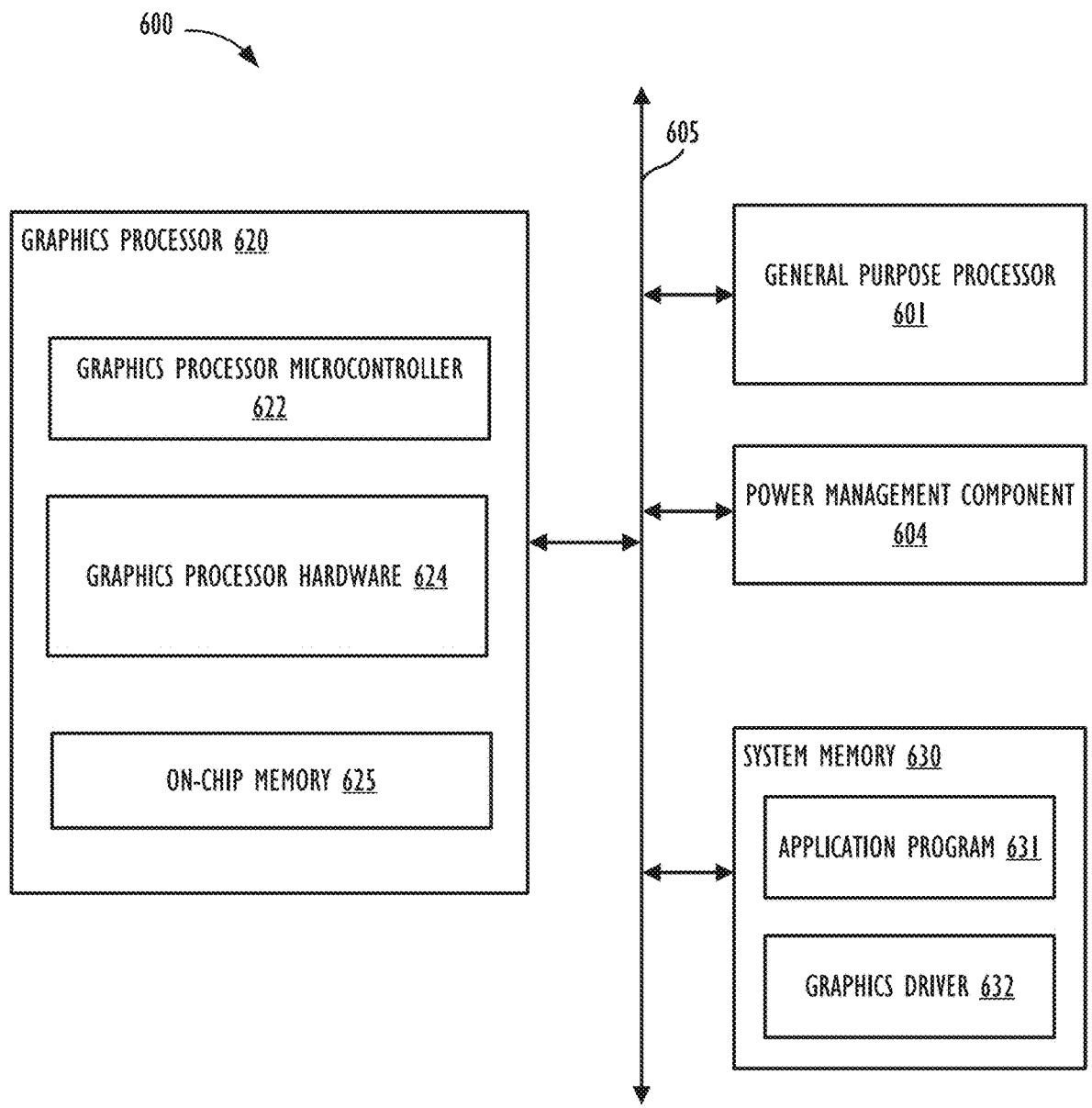
FIG. 6 is a block diagram of computing system configured to manage power for a graphics processor.

FIG. 6 is a block diagram of computing system 600 configured to manage power for a graphics processor. Computing system 600 includes a general purpose processor 601, a graphics processor 620 a power management component 604, and system memory 630. In one implementation, general purpose processor 601 and graphics processor 620 are included on separate integrated circuits (ICs) or IC packages. In other implementations, however, general purpose processor 601 and graphics processor 620, or the collective functionality thereof, may be included in a single IC or package. Data bus 605 connects different elements of the computing system 600 including general purpose processor 601, a graphics processor 620 a power management component 604, and system memory 630. In an implementation, system memory 630 includes instructions that cause the general purpose processor 601 and/or graphics processor 620 to perform the functions ascribed to them in this disclosure. More specifically, graphics processor 620 can receive instructions transmitted by general purpose processor 601 and processes the instructions to render a graphics frame.

System memory 630 may include application program 631 and graphics driver 632. The graphics processor 620 in this example include a graphics proccessor microcontroller 622, graphics processor hardware 624, and on-chip memory 625. For example, a GPU can utilize the graphics processor hardware 624 to process vertex shaders, geometry shaders and fragment shaders. Application program 631 includes code written using a graphics API. Application program 631 generates API commands to render graphics frame. The graphics driver 632 translates the high-level shading programs into machine code shading programs for processing by the graphics processor 620.

For managing power for the graphics processor, the computing system 600 includes a graphics processor microcontroller 622 and power management component 604. To determine when to power on and off the graphics processor, graphics processor microcontroller 622 and/or power management component 604 predicts when the graphics processor will receive work when processing a graphics frame. The graphics processor microcontroller 622 and/or power management component 604 creates a frame structure histogram that includes a probability distribution function curve. The graphics processor microcontroller 622 and/or power management component 604 generates the probability distribution function curve based on available work histories for a number of pervious frames. The graphics microcontroller can then utilize the frame structure histogram and/or other factors, such as power and performance settings and/or confidence levels, to predict when to power on and off the graphics processor.

Illustrative Hardware and Software

The disclosure may have implication and use in and with respect to variety of electronic devices, including single-and multi-processor computing systems, and vertical devices (e.g., cameras, gaming systems, appliances, etc.) that incorporate single- or multi-processing computing systems. The discussion herein is made with reference to a common computing configuration for many different electronic computing devices (e.g., computer, laptop, mobile devices, etc.). This common computing configuration may have a CPU resource including one or more microprocessors and a graphics processing resource including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 7:
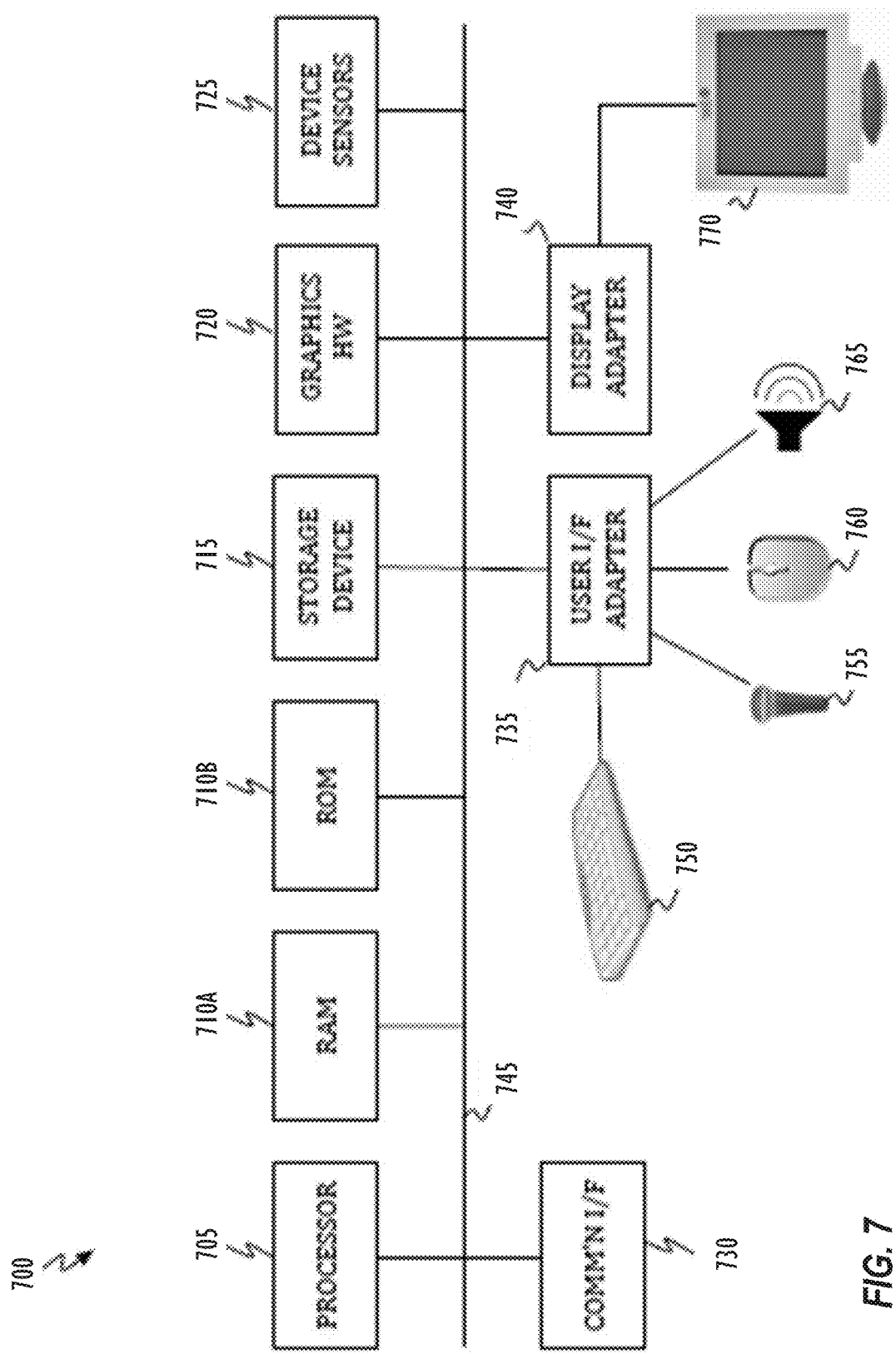
FIG. 7 is a block diagram of a computing system where embodiments of the present disclosure may operate.

Referring to FIG. 7, the disclosed implementations may be performed by representative computing system 700. For example the representative computer system may act as an end-user device or any other device that produces or displays graphics. For example, computing system 700 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 700 may include one or more processors 705, memory 710 (710A and 710B), one or more storage devices 715, and graphics hardware 720 (e.g., including one or more graphics processors). Computing system 700 may also have device sensors 725, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 7, system 700 may also include communication interface 730, user interface adapter 735, and display adapter 740—all of which may be coupled via system bus, backplane, fabric or network 745. Memory 710 may include one or more different types of non-transitory media (e.g., solid-state, DRAM, optical, magnetic, etc.) used by processor 705 and graphics hardware 720. For example, memory 710 may include memory cache, read-only memory (ROM), and/or random access memory (RAM). Storage 715 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EEPROM). Memory 710 and storage 715 may be used to retain media data (e.g., audio, image, and video files), preference information, device profile information, computer program instructions organized into one or more modules and written in any desired computer programming language, and any other suitable data. When executed by processor 705 and/or graphics hardware 720, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor resource.

Communication interface 730 may include semiconductor-based circuits and may be used to connect computing system 700 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 735 may be used to connect keyboard 750, microphone 755, pointer device 760, speaker 765, and other user interface devices such as a touchpad and/or a touch screen (not shown). Display adapter 740 may be used to connect one or more displays 170.

Processor 705 may execute instructions necessary to carry out or control the operation of many functions performed by computing system 700 (e.g., evaluation, transformation, mathematical computation, or compilation of graphics programs, etc.). Processor 705 may, for instance, drive display 770 and receive user input from user interface adapter 735 or any other user interfaces embodied by a system. User interface adapter 735, for example, can take a variety of forms, such as a button, a keypad, a touchpad, a mouse, a dial, a click wheel, a keyboard, a display screen, and/or a touch screen. In addition, processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 in performing computational tasks. In some implementations, graphics hardware 720 may include CPU-integrated graphics and/or one or more discrete programmable GPUs. Computing system 700 (implementing one or more implementations discussed herein) can allow for one or more users to control the same system (e.g., computing system 700) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 7, device sensors 725 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 725 may be processed, at least in part, by processors 705 and/or graphics hardware 720, and/or a dedicated image processing unit incorporated within or without computing system 700. Information so captured may be stored in memory 710 and/or storage 715 and/or any storage accessible on an attached network. Memory 710 may include one or more different types of media used by processor 705, graphics hardware 720, and device sensors 725 to perform device functions. Storage 715 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 710 and storage 715 may be used to retain computer program instructions or code organized into one or more modules in either compiled form or written in any desired computer programming language. When executed by, for example, a microcontroller, GPU or processor 705, such computer program code may implement one or more of the acts or functions described herein (e.g., interpreting and responding to user activity including commands and/or gestures).

As noted above, implementations within this disclosure include software. As such, a description of common computing software architecture is provided as expressed in a layer diagram in FIG. 8. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 895 illustrating hardware layer 840, which may include memory, general purpose processors, graphics processors, microcontrollers, or other processing and/or computer hardware such as memory controllers and specialized hardware. Above the hardware layer is the operating system kernel layer 890 showing an example as operating system kernel 845, which is kernel software that may perform memory management, device management, and system calls. The operating system kernel layer 890 is the typical location of hardware drivers, such as a graphics processor drivers. The notation employed here is generally intended to imply that software elements shown in a layer use resources from the layers below and provide services to layers above. However, in practice, all components of a particular software element may not behave entirely in that manner.

Returning to FIG. 8, operating system services layer 885 is exemplified by operating system services 850. Operating system services 850 may provide core operating system functions in a protected environment. In addition, operating system services shown in operating system services layer 885 may include frameworks for OpenGL®/OpenCL® 851, CUDA® or the like, Metal® 852, user space drivers 853, and a Software Rasterizer 854. (OPENCL is a registered trademark of Apple Inc. CUDA is a registered trademark of NVIDIA Corporation.) While most of these examples all relate to graphics processor processing or graphics and/or graphics libraries, other types of services are contemplated by varying implementations of the disclosure. These particular examples also represent graphics frameworks/libraries that may operate in the lower tier of frameworks, such that developers may use shading and primitives and/or obtain fairly tightly coupled control over the graphics hardware. In addition, the particular examples named in FIG. 8 may also pass their work product on to hardware or hardware drivers, such as the graphics processor driver, for display-related material or compute operations.

Referring again to FIG. 8, OpenGL® /OpenCL® 851 represent examples of well-known libraries and application programming interfaces for graphics processor compute operations and graphics rendering including 2D and 3D graphics. Metal® 852 also represents a published graphics library and framework, but it is generally considered lower level than OpenGL® /OpenCL® 851, supporting fine-grained, low-level control of the organization, processing, and submission of graphics and computation commands, as well as the management of associated data and resources for those commands. User space drivers 853 is software relating to the control of hardware that exists in the user space for reasons that are typically related to the particular device or function. In many implementations, user space drivers 853 work cooperatively with kernel drivers and/or firmware to perform the overall function of a hardware driver. Software Rasterizer 854 refers generally to software used to make graphics information such as pixels without specialized graphics hardware (e.g., using only the CPU). These libraries or frameworks shown within the operating system services layer 885 are only exemplary and intended to show the general level of the layer and how it relates to other software in a sample arrangement (e.g., kernel operations usually below and higher-level applications services 860 usually above). In addition, it may be useful to note that Metal® 852 represents a published framework/library of Apple Inc. that is known to developers in the art. Furthermore, OpenGL® /OpenCL® 851 may represent frameworks/libraries present in current versions of software distributed by Apple Inc.

Above the operating system services layer 885 there is an application services layer 880, which includes Sprite Kit 861, Scene Kit 862, Core Animation 863, Core Graphics 864, and other applications services 860. The operating system services layer 885 represents higher-level frameworks that are commonly directly accessed by application programs. In some implementations of this disclosure the operating system services layer 885 includes graphics-related frameworks that are high level in that they are agnostic to the underlying graphics libraries (such as those discussed with respect to operating system services layer 885). In such implementations, these higher-level graphics frameworks are meant to provide developer access to graphics functionality in a more user/developer friendly way and allow developers to avoid work with shading and primitives. By way of example, Sprite Kit 861 is a graphics rendering and animation infrastructure made available by Apple Inc. Sprite Kit 861 may be used to animate textured images or "sprites." Scene Kit 862 is a 3D-rendering framework from Apple Inc. that supports the import, manipulation, and rendering of 3D assets at a higher level than frameworks having similar capabilities, such as OpenGL. Core Animation 863 is a graphics rendering and animation infrastructure made available from Apple Inc. Core Animation 863 may be used to animate views and other visual elements of an application. Core Graphics 864 is a two-dimensional drawing engine from Apple Inc., which provides 2D rendering for applications.

Above the application services layer 880, there is the application layer 875, which may comprise any type of application program. By way of example, FIG. 8 shows three specific applications: photos 871 (a photo management, editing, and sharing program), Quicken® 872 (a financial management program), and iMovie® 873 (a movie making and sharing program). (QUICKEN is a registered trademark of Intuit Inc. IMOVIE is a registered trademark of Apple Inc.). Application layer 875 also shows two generic applications 870 and 874, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 885 and applications services layer 880, it may be useful to realize that different frameworks have higher- or lower-level application program interfaces, even if the frameworks are represented in the same layer of the FIG. 8 diagram. The illustration of FIG. 8 serves to provide a general guideline and to introduce exemplary frameworks that may be discussed later. Furthermore, some implementations of the disclosure may imply that frameworks in application services layer 880 make use of the libraries represented in operating system services layer 885. Thus, FIG. 8 provides intellectual reinforcement for these examples. Importantly, FIG. 8 is not intended to limit the types of frameworks or libraries that may be used in any particular way or in any particular implementation. Generally, many implementations of this disclosure relate to the ability of applications in layer 875 or frameworks in layers 880 or 885 to divide long continuous graphics processor tasks into smaller pieces. In addition, many implementations of the disclosure relate to graphics processor (e.g., GPU) driver software in operating system kernel layer 890 and/or embodied as microcontroller firmware in hardware layer 895; such drivers performing a scheduling function for the graphics processor resource (e.g., GPU).

At least one implementation is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by a microcontroller in a first power domain relative to a graphics processor in a second power domain separate from the first power domain and comprising instructions stored thereon to cause the microcontroller to:
   receive work history for a plurality of previously processed frames by the graphics processor;
   create a probability distribution function for a current frame based on the work history, wherein the probability distribution function is indicative of a prediction of when the graphics processor will receive work for processing the current frame;
   obtain a first latency value indicative of a time period to transition a component of the graphics processor in the second power domain from a first power state to a second power state;
   instruct, when processing the current frame, the component of the graphics processor to transition to a power off state based on the probability distribution function and the latency value; and
   selectively power down the microcontroller itself based on the prediction and a second latency value indicative of a time period to change a power state of the microcontroller.

2. The non-transitory program storage device of claim 1, where the instructions further cause the microcontroller to:
   determine a confidence level for the probability distribution function; and
   instruct, when processing the current frame, the component of the graphics processor to transition to the second power state based on the probability distribution function, the first latency value, and the confidence level.

3. The non-transitory program storage device of claim 1, wherein the instructions further cause the microcontroller to:
   determine a power and performance setting for the graphics processor, wherein instructing, when processing the current frame, the component of the graphics processor to transition to the second power state is further based on the power and performance setting.

4. The non-transitory program storage device of claim 1, wherein the instructions further cause the microcontroller to:
   determine a third latency value indicative of a time period to transition the component of the graphics processor from the second power state to the first power state, wherein instructing, when processing the current frame, the component of the graphics processor to transition to the second power state is further based on the third latency value.

5. The non-transitory program storage device of claim 1, wherein the second latency value is indicative of a time period to transition the microcontroller from the first power state to the second power state, and the instructions further cause the processor to:
   obtain a third latency value indicative of a time period to transition the graphics microcontroller from the second power state to the first power state; and
   transition the microcontroller from the first power state to the second power state based on the probability distribution function, the second latency value, and the third latency value.

6. The non-transitory program storage device of claim 5, wherein the first latency value is less than the second latency value.

7. The non-transitory program storage device of claim 1, wherein the first power state is a power on state and the second power state is a power off state, and wherein the instructions further cause the processor to update a confidence level for the probability distribution function when the component of the graphics processor is in the second power state and the graphics processor receives work for the current frame.

8. The non-transitory program storage device of claim 1, wherein the probability distribution function is based on work start times for the graphics processor.

9. The non-transitory program storage device of claim 1, wherein the probability distribution function is based on presence of available work for the graphics processor.

10. A system comprising:
    memory; and
    a microcontroller in a first power domain operable to interact with the memory, and configured to:
      receive work history for a plurality of previously processed frames by a graphics processor in a second power domain separate from the first power domain;
      monitor a current work cycle for a current frame being processed by the graphics processor;
      determine the graphics processor is idle for the current work cycle;
      predict an idle period for the graphics processor based on the work history;
      obtain a first latency value indicative of a power on time period to transition a graphics processor hardware from a power off state to a power on state;
      instruct, when processing the current frame, the graphics processor hardware to transition to the power off state based on a determination that the first latency value is less than the predicted idle period; and
      selectively power down the microcontroller itself based on the predicted idle period and a second latency value indicative of a time period to change a power state of the microcontroller.

11. The system of claim 10, wherein the microcontroller is further configured to:
    determine a confidence level related to the predicted idle period, wherein instructing, when processing the current frame, the graphics processor hardware to transition to the power off state is further based on the confidence level.

12. The system of claim 10, wherein the microcontroller is further configured to:
   determine a power and performance setting for the graphics processor, wherein instructing, when processing the current frame, the graphics processor hardware to transition to the power off state is further based on the power and performance setting.

13. The system of claim 10, wherein the microcontroller is further configured to:
   determine a third latency value indicative of a power off time period to transition the graphics processor hardware from the power on state to a power off state, wherein instructing, when processing the current frame, the graphics processor hardware to transition to the power off state is further based on a determination that a total latency value of the first latency value and the third latency value is less than the predicted idle period.

14. The system of claim 10, wherein the microcontroller is configured to predict an idle period for the graphics processor based on the work history by generating a probability distribution function.

15. The system of claim 14, wherein the probability distribution function is based on work start times for the graphics processor.

16. The system of claim 14, wherein the probability distribution function is based on presence of available work for the graphics processor.

17. The system of claim 10, wherein the microcontroller is embedded within the graphics processor.

18. A method comprising:
   receiving, by a microcontroller in a first power domain, work history for a plurality of previously processed frames by a graphics processing unit (GPU) in a second power domain separate from the first power domain;
   determining, by the microcontroller, the GPU is idle for a current work cycle for a current frame being processed by the GPU;
   performing, by the microcontroller, a heuristics operation to predict an idle period for the GPU based on the work history;
   obtaining, by the microcontroller, a first latency value indicative of a time period to transition a GPU component from a power off state to a power on state and a second latency value indicative of a time period to transition the GPU component from the power on state to the power off state;
   providing, by the microcontroller, power instructions to transition the GPU component to the power off state based on a determination that a combined latency value of the first latency value and the second latency value is less than the predicted idle period; and
   selectively powering down, by the microcontroller, the microcontroller itself based on the predicted idle period and a third latency value indicative of a time period to change a power state of the microcontroller.

19. The method of claim 18, wherein the third latency value is based on: a first time period to change a power state of the microcontroller from on to off; and a second time period to change a power state of the microcontroller from off to on.

20. The method of claim 18, further comprising:
   determining a confidence level related to the predicted idle periods; and receiving a power and performance setting, wherein providing power instructions to transition the GPU component to the power off state is further based on the confidence level and the power and performance setting.

21. A circuit comprising:
   a microcontroller in a first power domain; and
   a graphics processor in a second power domain separate from the first power domain, wherein the microcontroller is configured to:
      receive work history for a plurality of previously processed frames by a graphics processor;
      predict an idle period for the graphics processor based on the work history;
      obtain a first latency value indicative of a power on time period to transition a graphics processor hardware from a power off state to a power on state;
      instruct the graphics processor hardware to transition to the power off state based on a determination that the first latency value is less than the predicted idle period; and
      selectively power down the microcontroller itself based on the predicted idle period and a second latency value indicative of a time period to change a power state of the microcontroller.

* * * * *

UNITED STATES PATENT AND TRADEMARK OFFICE
CERTIFICATE OF CORRECTION

PATENT NO. : 11,243,598 B2
APPLICATION NO. : 16/426633
DATED : February 8, 2022
INVENTOR(S) : Tatsuya Iwamoto et al.

It is certified that error appears in the above-identified patent and that said Letters Patent is hereby corrected as shown below:

In the Claims

Claim 5, at Column 22, Line 17 delete "graphics" before -- microcontroller --

Claim 20, at Column 24, Line 21 replace "periods" with -- period --

Signed and Sealed this
Twenty-sixth Day of April, 2022

Katherine Kelly Vidal
*Director of the United States Patent and Trademark Office*